United States Patent
Schultz et al.

(10) Patent No.: US 8,204,341 B2
(45) Date of Patent: *Jun. 19, 2012

(54) METHOD AND APPARATUS FOR CAPTURING, GEOLOCATING AND MEASURING OBLIQUE IMAGES

(75) Inventors: Stephen L. Schultz, West Henrietta, NY (US); Frank D. Giuffrida, Honeoye Falls, NY (US); Robert L. Gray, Canandaigua, NY (US); Charles Mondello, Pittsford, NY (US)

(73) Assignee: Pictometry International Corp., Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/950,653

(22) Filed: Nov. 19, 2010

(65) Prior Publication Data

US 2011/0091076 A1     Apr. 21, 2011

Related U.S. Application Data

(63) Continuation of application No. 12/853,616, filed on Aug. 10, 2010, now Pat. No. 7,995,799, which is a continuation of application No. 12/186,889, filed on Aug. 6, 2008, now Pat. No. 7,787,659, which is a continuation of application No. 10/701,839, filed on Nov. 5, 2003, now Pat. No. 7,424,133.

(60) Provisional application No. 60/425,275, filed on Nov. 8, 2002.

(51) Int. Cl.
*G06K 9/00* (2006.01)
*G06K 9/54* (2006.01)
*G06K 9/60* (2006.01)

(52) U.S. Cl. ........ 382/305; 382/106; 382/284; 382/294; 348/143; 356/3; 356/601

(58) Field of Classification Search .................. 382/106, 382/154, 284, 294, 305, 306; 348/113–118, 348/143–148; 356/3–3.09, 601–613

See application file for complete search history.

(56) References Cited

U.S. PATENT DOCUMENTS 7,424,133 B2 * 9/2008 Schultz et al. ................ 382/106
7,787,659 B2 * 8/2010 Schultz et al. ................ 382/106

FOREIGN PATENT DOCUMENTS

WO      99/18732     *    4/1999

OTHER PUBLICATIONS

Rattigan, David. "Towns Get New View From Above", The Boston Globe, Sep. 5, 2002.*
Unknown Author, "Live Automatic Coordinates for Aerial Images", Advanced Imaging, Jun. 1997.*
Japanese Questioning and Translation, Nov. 16, 2010.

* cited by examiner

*Primary Examiner* — Aaron W Carter
(74) *Attorney, Agent, or Firm* — Dunlap Codding, P.C.

(57) ABSTRACT

A computerized system having a computer system storing a database of captured oblique images having corresponding geo-location data. The computerized system also has a data table storing ground plane data that approximates at least a portion of the terrain depicted within the captured oblique images. The computer system further has computer executable logic that when executed by a processor causes the computer system to receive a selection of a geographic point from a user, search the database to find images that contain the selected point, and make the images available to the user.

16 Claims, 10 Drawing Sheets

METHOD AND APPARATUS FOR CAPTURING, GEOLOCATING AND MEASURING OBLIQUE IMAGES

CROSS-REFERENCE TO RELATED APPLICATIONS

This application is a continuation of U.S. Ser. No. 12/853,616, Filed Aug. 10, 2010, now U.S. Pat. No. 7,995,799 which is a continuation of U.S. Ser. No. 12/186,889, filed Aug. 6, 2008, which issued as U.S. Pat. No. 7,787,659, on Aug. 31, 2010, which is a continuation of U.S. Ser. No. 10/701,839, filed on Nov. 5, 2003, which issued as U.S. Pat. No. 7,424,133, on Sep. 9, 2004, which claims priority to the provisional patent application identified by U.S. Ser. No. 60/425,275, filed Nov. 8, 2002, of which the entire content of each is hereby expressly incorporated by reference.

TECHNICAL FIELD

The present invention relates to photogrammetry. More particularly, the present invention relates to a method and apparatus for capturing oblique images and for measuring the objects and distances between the objects depicted therein.

BACKGROUND

Photogrammetry is the science of making measurements of and between objects depicted within photographs, especially aerial photographs. Generally, photogrammetry involves taking images of terrestrial features and deriving data therefrom, such as, for example, data indicating relative distances between and sizes of objects within the images. Photogrammetry may also involve coupling the photographs with other data, such as data representative of latitude and longitude. In effect, the image is overlaid and conformed to a particular spatial coordinate system.

Conventional photogrammetry involves the capture and/or acquisition of orthogonal images. The image-capturing device, such as a camera or sensor, is carried by a vehicle or platform, such as an airplane or satellite, and is aimed at a nadir point that is directly below and/or vertically downward from that platform. The point or pixel in the image that corresponds to the nadir point is the only point/pixel that is truly orthogonal to the image-capturing device. All other points or pixels in the image are actually oblique relative to the image-capturing device. As the points or pixels become increasingly distant from the nadir point they become increasingly oblique relative to the image-capturing device and the ground sample distance (i.e., the surface area corresponding to or covered by each pixel) also increases. Such obliqueness in an orthogonal image causes features in the image to be distorted, especially images relatively distant from the nadir point.

Such distortion is removed, or compensated for, by the process of ortho-rectification which, in essence, removes the obliqueness from the orthogonal image by fitting or warping each pixel of an orthogonal image onto an orthometric grid or coordinate system. The process of ortho-rectification creates an image wherein all pixels have the same ground sample distance and are oriented to the north. Thus, any point on an ortho-rectified image can be located using an X, Y coordinate system and, so long as the image scale is known, the length and width of terrestrial features as well as the relative distance between those features can be calculated.

Although the process of ortho-rectification compensates to a degree for oblique distortions in an orthogonal image, it introduces other undesirable distortions and/or inaccuracies in the ortho-rectified orthogonal image. Objects depicted in ortho-rectified orthogonal images may be difficult to recognize and/or identify since most observers are not accustomed to viewing objects, particularly terrestrial features, from above. To an untrained observer an ortho-rectified image has a number of distortions. Roads that are actually straight appear curved and buildings may appear to tilt. Further, ortho-rectified images contain substantially no information as to the height of terrestrial features. The interpretation and analysis of orthogonal and/or ortho-rectfified orthogonal images is typically performed by highly-trained analysts whom have undergone years of specialized training and experience in order to identify objects and terrestrial features in such images.

Thus, although orthogonal and ortho-rectified images are useful in photogrammetry, they lack information as to the height of features depicted therein and require highly-trained analysts to interpret detail from what the images depict.

Oblique images are images that are captured with the image-capturing device aimed or pointed generally to the side of and downward from the platform that carries the image-capturing device. Oblique images, unlike orthogonal images, display the sides of terrestrial features, such as houses, buildings and/or mountains, as well as the tops thereof. Thus, viewing an oblique image is more natural and intuitive than viewing an orthogonal or ortho-rectified image, and even casual observers are able to recognize and interpret terrestrial features and other objects depicted in oblique images. Each pixel in the foreground of an oblique image corresponds to a relatively small area of the surface or object depicted (Le., each foreground pixel has a relatively small ground sample distance) whereas each pixel in the background corresponds to a relatively large area of the surface or object depicted (i.e., each background pixel has a relatively large ground sample distance). Oblique images capture a generally trapezoidal area or view of the subject surface or object, with the foreground of the trapezoid having a substantially smaller ground sample distance (i.e., a higher resolution) than the background of the trapezoid.

Oblique images are considered to be of little or no use in photogrammetry. The conventional approach of forcing the variously-sized foreground and background pixels of an oblique image into a uniform size to thereby warp the image onto a coordinate system dramatically distorts the oblique image and thereby renders identification of objects and the taking of measurements of objects depicted therein a laborious and inaccurate task. Correcting for terrain displacement within an oblique image by using an elevation model further distorts the images thereby increasing the difficulty with which measurements can be made and reducing the accuracy of any such measurements.

Thus, although oblique images are considered as being of little or no use in photogrammetry, they are easily interpreted and contain information as to the height of features depicted therein. Therefore, what is needed in the art is a method and apparatus for photogrammetry that enable geo-location and accurate measurements within oblique images.

Moreover, what is needed in the art is a method and apparatus for photogrammetry that enable the measurement of heights and relative heights of objects within an image. Furthermore, what is needed in the art is a method and apparatus for photogrammetry that utilizes more intuitive and natural images.

SUMMARY OF THE INVENTION

The present invention provides a method and apparatus for capturing, displaying, and making measurements of objects and distances between objects depicted within oblique images. The present invention comprises, in one form thereof, a computerized system for displaying, geolocating, and taking measurements from captured oblique images. The system includes a data file accessible by the computer system. The data file includes a plurality of image files corresponding to a plurality of captured oblique images, and positional data corresponding to the images. Image display and analysis software is executed by the system for reading the data file and displaying at least a portion of the captured oblique images. The software retrieves the positional data for one or more user-selected points on the displayed image, and calculates a separation distance between any two or more selected points. The separation distance calculation is user-selectable to determine various parameters including linear distance between, area encompassed within, relative elevation of, and height difference between selected points.

BRIEF DESCRIPTION OF THE DRAWINGS

The above-mentioned and other features and advantages of this invention, and the manner of attaining them, will become apparent and be more completely understood by reference to the following description of one embodiment of the invention when read in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DESCRIPTION OF THE PREFERRED EMBODIMENTS

Figure 1:
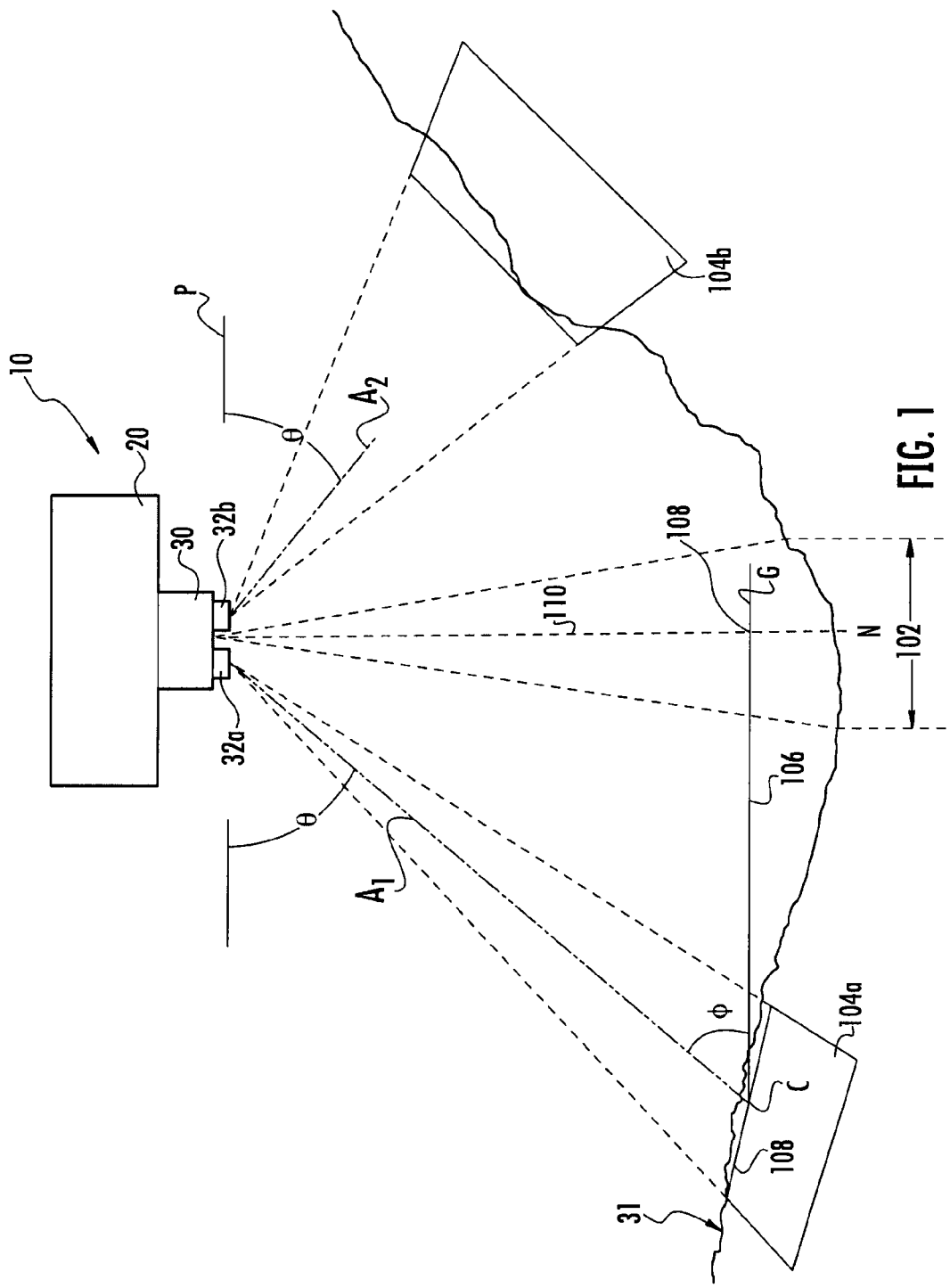
FIG. 1 illustrates one embodiment of a platform or vehicle carrying an image-capturing system of the present invention, and shows exemplary orthogonal and oblique images taken thereby.

Referring now to the drawings, and particularly to FIG. 1, one embodiment of an apparatus for capturing and geolocating oblique images of the present invention is shown. Apparatus 10 includes a platform or vehicle 20 that carries image-capturing and geolocating system 30.

Platform 20, such as, for example, an airplane, space shuttle, rocket, satellite, or any other suitable vehicle, carries image-capturing system 30 over a predefined area of and at one or more predetermined altitudes above surface 31, such as, for example, the earth's surface or any other surface of interest. As such, platform 20 is capable of controlled movement or flight, either manned or unmanned, along a predefined flight path or course through, for example, the earth's atmosphere or outer space. Image capturing platform 20 includes a system for generating and regulating power (not shown) that includes, for example, one or more generators, fuel cells, solar panels, and/or batteries, for powering image-capturing system 30.

Figure 2:
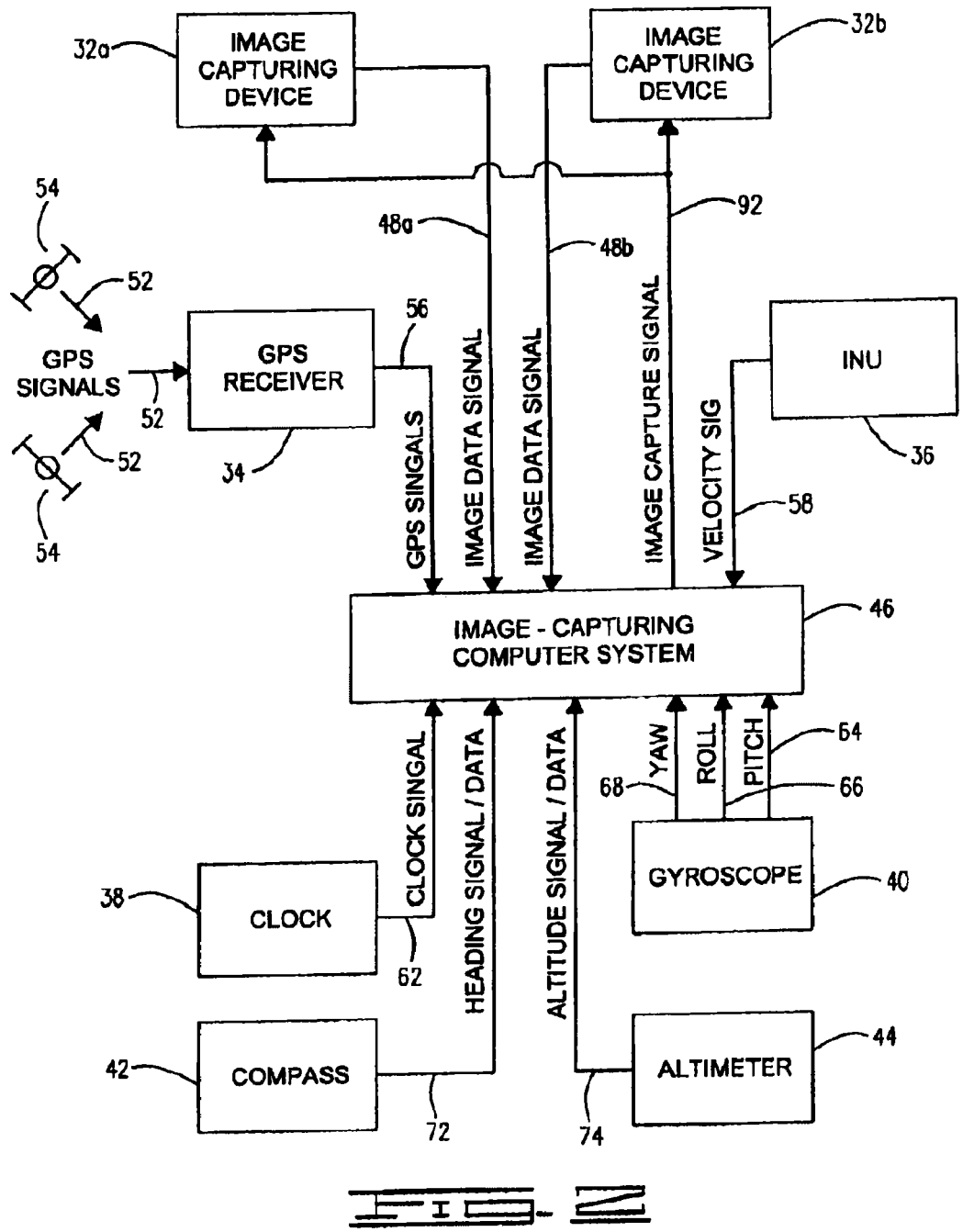
FIG. 2 is a diagrammatic view of the image-capturing system of FIG. 1.

Image-capturing and geo-locating system 30, as best shown in FIG. 2, includes image capturing devices 32a and 32b, a global positioning system (GPS) receiver 34, an inertial navigation unit (INU) 36, clock 38, gyroscope 40, compass 42 and altimeter 44, each of which are interconnected with image-capturing computer system 46.

Image-capturing devices 32a and 32b, such as, for example, conventional cameras, digital cameras, digital sensors, charge-coupled devices, or other suitable image-capturing devices, are capable of capturing images photographically or electronically. Image-capturing devices 32a and 32b have known or determinable characteristics including focal length, sensor size and aspect ratio, radial and other distortion terms, principal point offset, pixel pitch, and alignment. Image-capturing devices 32a and 32b acquire images and issue image data signals (IDS) 48a and 48b, respectively, corresponding to the particular images or photographs taken and which are stored in image-capturing computer system 46, as will be more particularly described hereinafter.

As best shown in FIG. 1, image-capturing devices 32a and 32b have respective central axes $A_1$ and $A_2$, and are mounted to platform 20 such that axes $A_1$ and $A_2$ are each at an angle of declination Ø relative to a horizontal plane P. Declination angle Ø is virtually any oblique angle, but is preferably from approximately 20° (twenty degrees) to approximately 60° (sixty degrees) and is most preferably from approximately 40° (forty degrees) to approximately 50° (fifty degrees).

GPS receiver 34 receives global positioning system signals 52 that are transmitted by one or more global positioning system satellites 54. The GPS signals 52, in known fashion, enable the precise location of platform 20 relative to surface 31 to be determined. GPS receiver 34 decodes GPS signals 52 and issues location signals/data 56, that are dependent at least in part upon GPS signals 52 and which are indicative of the precise location of platform 20 relative to surface 31. Location signals/data 56 corresponding to each image captured by image-capturing devices 32a and 32b are received and stored by image-capturing computer system 46.

INU 36 is a conventional inertial navigation unit that is coupled to and detects changes in the velocity, including translational and rotational velocity, of image-capturing devices 32a and 32b and/or platform 20. INU 36 issues velocity signals/data 58 indicative of such velocities and/or changes therein to image-capturing computer system 46, which stores velocity signals/data 58 corresponding to each image captured by image-capturing devices 32a and 32b are received and stored by image-capturing computer system 46.

Clock 38 keeps a precise time measurement (time of validity) that is used to synchronize events within image-capturing and geo-locating system 30. Clock 38 provides time data/ clock signal 62 that is indicative of the precise time that an image is taken by image-capturing devices 32a and 32b. Time data 62 is also provided to and stored by image-capturing computer system 46. Alternatively, clock 38 is integral with image-capturing computer system 46, such as, for example, a clock software program.

Gyroscope 40 is a conventional gyroscope as commonly found on airplanes and/or within commercial navigation systems for airplanes. Gyroscope 40 provides signals including pitch signal 64, roll signal 66 and yaw signal 68, which are respectively indicative of pitch, roll and yaw of platform 20. Pitch signal 64, roll signal 66 and yaw signal 68 corresponding to each image captured by mage-capturing devices 32a and 32b are received and stored by image-capturing computer system 46.

Compass 42, such as, for example, a conventional electronic compass, indicates the heading of platform 20. Compass 42 issues heading signal/data 72 that is indicative of the heading of platform 20. Image-capturing computer system 46 receives and stores the heading signals/data 72 that correspond to each image captured by image-capturing devices 32a and 32b.

Altimeter 44 indicates the altitude of platform 20. Altimeter 44 issues altitude signal/data 74, and image-capturing computer system 46 receives and stores the altitude signal/data 74 that correspond to each image captured by image-capturing devices 32a and 32b.

Figure 3:
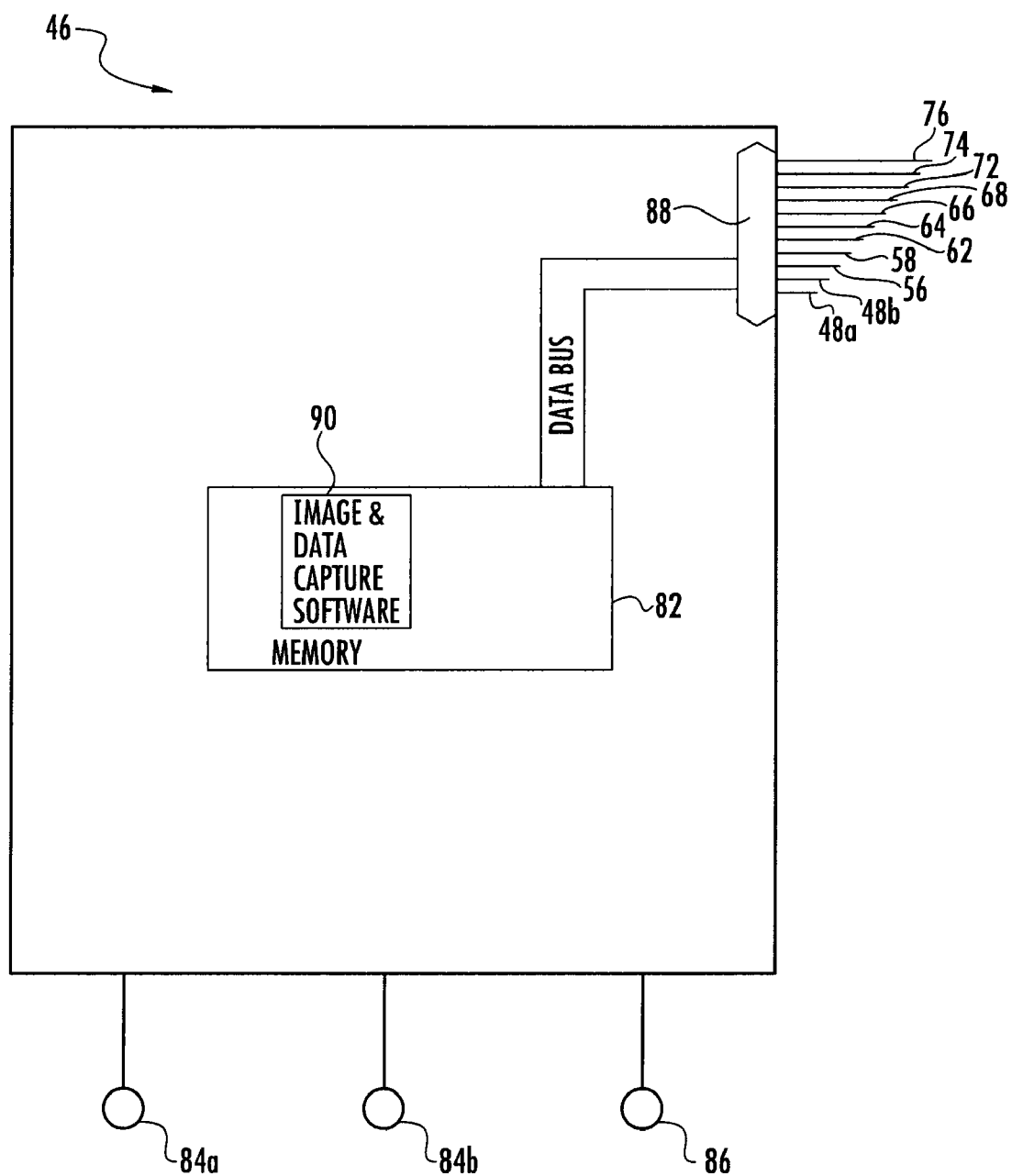
FIG. 3 is a block diagram of the image-capturing computer system of FIG. 2.

As best shown in FIG. 3, image-capturing computer system 46, such as, for example, a conventional laptop personal computer, includes memory 82, input devices 84a and 84b, display device 86, and input and output (I/O) ports 88. Image-capturing computer system 46 executes image and data acquiring software 90, which is stored in memory 82. Memory 82 also stores data used and/or calculated by image-capturing computer system 46 during the operation thereof, and includes, for example, non-volatile read-only memory, random access memory, hard disk memory, removable memory cards and/or other suitable memory storage devices and/or media. Input devices 84a and 84b, such as, for example, a mouse, keyboard, joystick, or other such input devices, enable the input of data and interaction of a user with software being executed by image-capturing computer system 46. Display device 86, such as, for example, a liquid crystal display or cathode ray tube, displays information to the user of image-capturing computer system 46. I/O ports 88, such as, for example, serial and parallel data input and output ports, enable the input and/or output of data to and from image-capturing computer system 46.

Each of the above-described data signals is connected to image-capturing computer system 46. More particularly, image data signals 48, location signals 56, velocity signals 58, time data signal 62, pitch, roll and yaw signals 64, 66 and 68, respectively, heading signal 72 and altitude signal 74 are received via I/O ports 88 by and stored within memory 82 of image-capturing computer system 46.

In use, image-capturing computer system 46 executes image and data acquiring software 90, which, in general, controls the reading, manipulation, and storing of the above-described data signals. More particularly, image and data acquiring software 90 reads image data signals 48a and 48b and stores them within memory 82. Each of the location signals 56, velocity signals 58, time data signal 62, pitch, roll and yaw signals 64, 66 and 68, respectively, heading signal 72 and altitude signal 74 that represent the conditions existing at the instant an image is acquired or captured by image-capturing devices 32a and 32b and which correspond to the particular image data signals 48a and 48b representing the captured images are received by image-capturing computer system 46 via I/O ports 88. Image-capturing computer system 46 executing image and data acquiring software 90 issues image-capture signal 92 to image-capturing devices 32a and 32b to thereby cause those devices to acquire or capture an image at predetermined locations and/or at predetermined intervals which are dependent at least in part upon the velocity of platform 20.

Image and data acquiring software 90 decodes as necessary and stores the aforementioned signals within memory 82, and associates the data signals with the corresponding image signals 48a and 48b. Thus, the altitude, orientation in terms of roll, pitch, and yaw, and the location of image-capturing devices 32a and 32b relative to surface 31, i.e., longitude and latitude, for every image captured by image-capturing devices 32a and 32b is known.

Platform 20 is piloted or otherwise guided through an image-capturing path that passes over a particular area of surface 31, such as, for-example, a predefined area of the surface of the earth or of another planet. Preferably, the image-capturing path of platform 20 is at right angles to at least one of the boundaries of the area of interest. The number of times platform 20 and/or image-capturing devices 32a, 32b pass over the area of interest is dependent at least in part upon the size of the area and the amount of detail desired in the captured images. The particular details of the image-capturing path of platform 20 are described more particularly hereinafter.

As platform 20 passes over the area of interest a number of oblique images are captured by image-capturing devices 32a and 32b. As will be understood by those of ordinary skill in the art, images are captured or acquired by image-capturing devices 32a and 32b at predetermined image capture intervals which are dependent at least in part upon the velocity of platform 20.

Image data signals 48a and 48b corresponding to each image acquired are received by and stored within memory 82 of image-capturing computer system 46 via I/O ports 88. Similarly, the data signals (i.e., image data signals 48, location signals 56, velocity signals 58, time data signal 62, pitch, roll and yaw signals 64, 66 and 68, respectively, heading signal 72 and altitude signal 74) corresponding to each captured image are received and stored within memory 82 of image-capturing computer system 46 via I/O ports 88. Thus, the location of image-capturing device 32a and 32b relative to surface 32 at the precise moment each image is captured is recorded within memory 82 and associated with the corresponding captured image.

As best shown in FIG. 1, the location of image-capturing devices 32a and 32b relative to the earth corresponds to the nadir point N of orthogonal image 102. Thus, the exact geo-location of the nadir point N of orthogonal image 102 is indicated by location signals 56, velocity signals 58, time data signal 62, pitch, roll and yaw signals 64,66 and 68, respectively, heading signal 72 and altitude signal 74. Once the nadir point N of orthogonal image 102 is known, the geo-location of any other pixel or point within image 102 is determinable in known manner.

When image-capturing devices 32a and 32b are capturing oblique images, such as oblique images 104a and 104b (FIG. 1), the location of image-capturing devices 32a and 32b relative to surface 31 is similarly indicated by location signals 56, velocity signals 58, time data signal 62, pitch, roll and yaw signals 64,66 and 68, respectively, heading signal 72, altitude signal 74 and the known angle of declination 0 of the primary axes $A_1$ and $A_2$ of image-capturing devices 32a and 32b, respectively.

It should be particularly noted that a calibration process enables image and data acquiring software 90 to incorporate correction factors and/or correct for any error inherent in or due to image-capturing device 32, such as, for example, error due to calibrated focal length, sensor size, radial distortion, principal point offset, and alignment.

Figure 4:
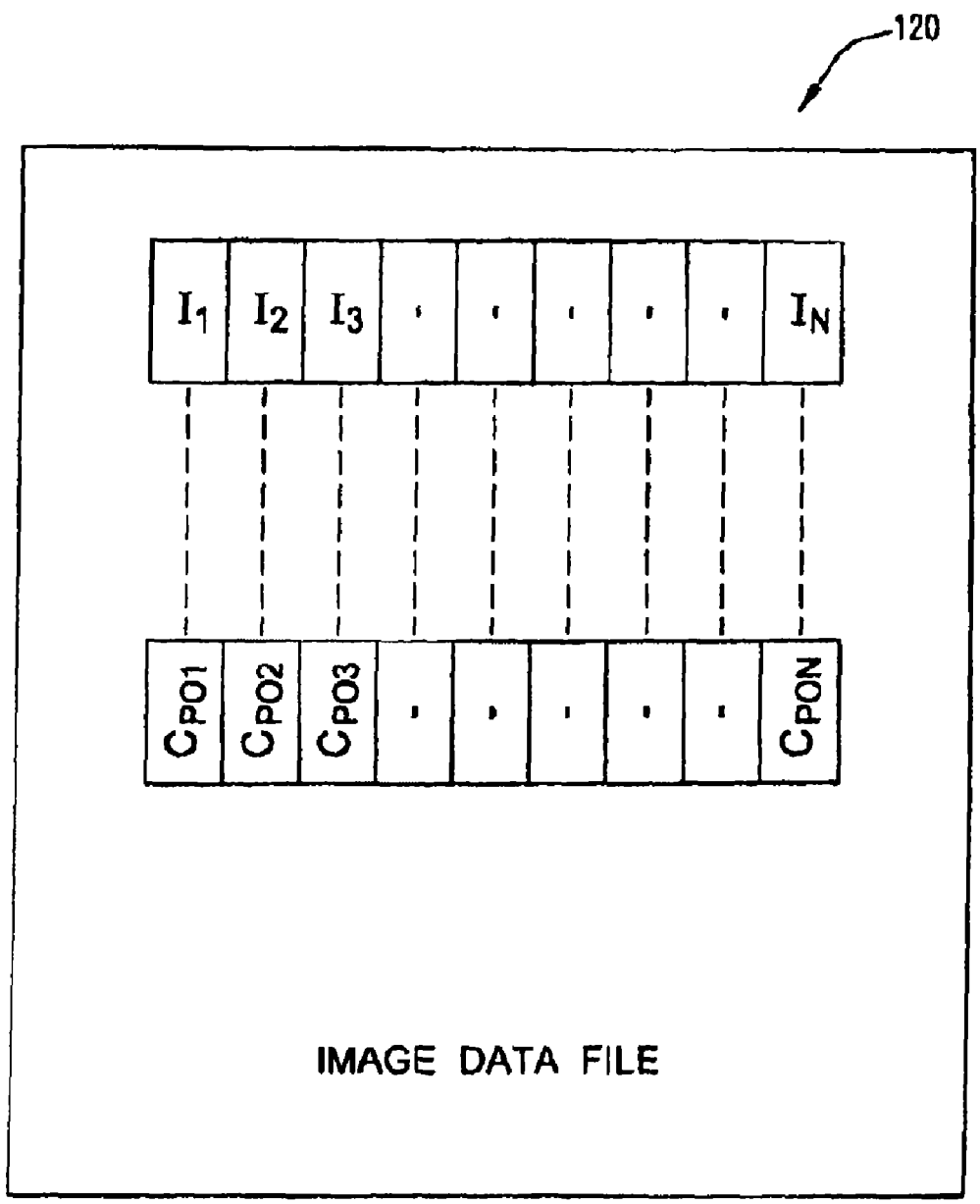
FIG. 4 is a representation of an exemplary output data file of the image-capturing system of FIG. 1.

Image and data acquiring software 90 creates and stores in memory 82 one or more output image and data files 120. More particularly, image and data acquiring software 90 converts image data signals 48a, 48b and the orientation data signals (i.e., image data signals 48, location signals 56, velocity signals 58, time data signal 62, pitch, roll and yaw signals 64, 66 and 68, respectively, heading signal 72 and altitude signal 74) into computer-readable output image and data files 120. As best shown in FIG. 4, output image and data file 120 contains a plurality of captured image files $I_1, I_2, \ldots, I_n$ corresponding to captured oblique images, and the positional data $C_{PD1}, C_{PD2}, \ldots, C_{PDn}$ corresponding thereto.

Image files $I_1, I_2, \ldots, I_n$ of the image and data file 120 are stored in virtually any computer-readable image or graphics file format, such as, for example, JPEG, TIFF, GIF, BMP, or PDF file formats, and are cross-referenced with the positional data $C_{PD1}, C_{PD2}, \ldots, C_{PDn}$ which is also stored as computer-readable data. Alternatively, positional data $C_{PD1}, C_{PD2}, \ldots, C_{PDn}$ is embedded within the corresponding image files $I_1, I_2, \ldots, I_n$ in known manner. Image data files 120 are then processed, either by image and data acquiring software 90 or by post-processing, to correct for errors, such as, for example, errors due to flight path deviations and other errors known to one of ordinary skill in the art. Thereafter, image data files 120 are ready for use to display and make measurements of and between the objects depicted within the captured images, including measurements of the heights of such objects.

Figure 5:
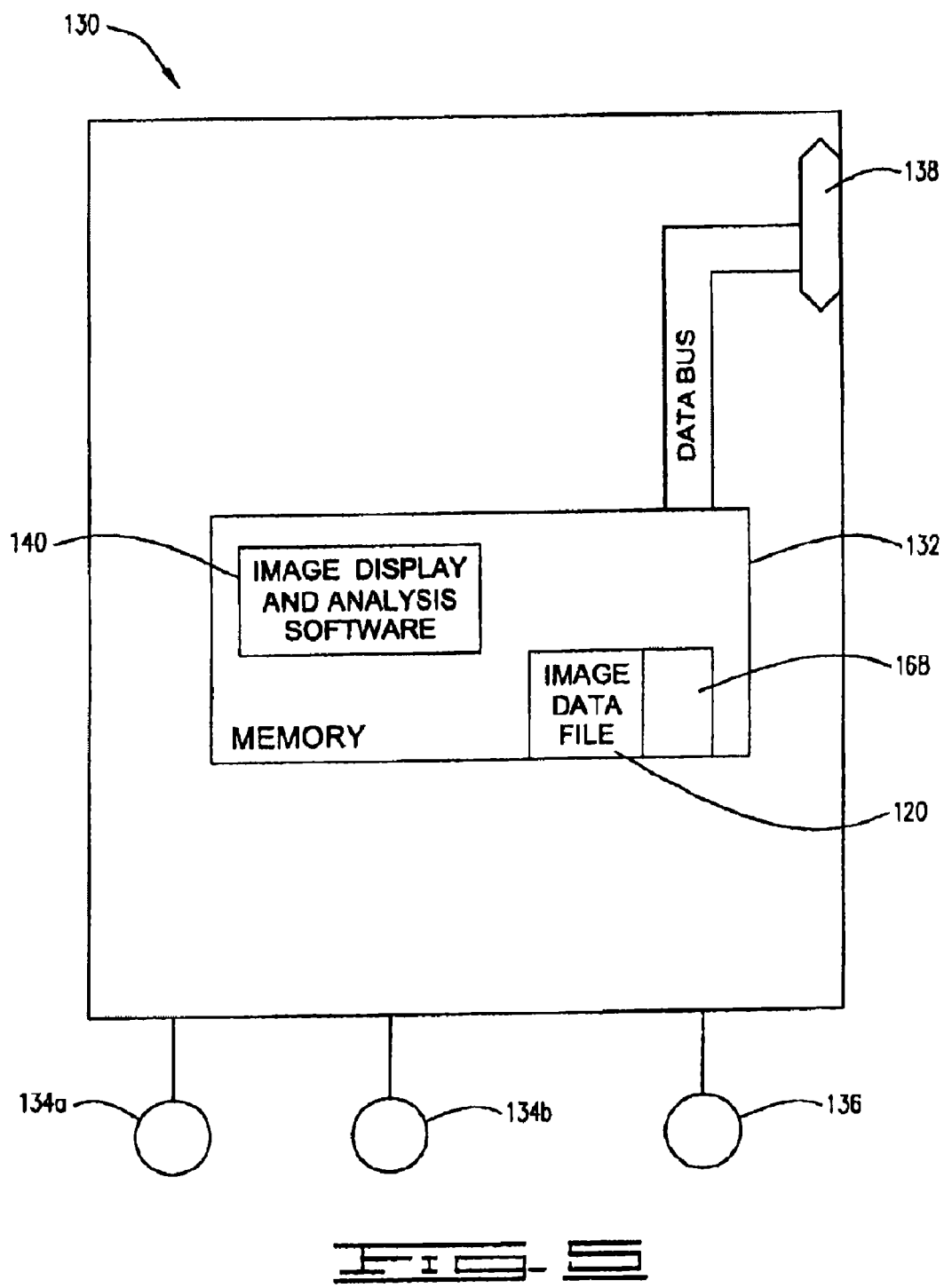
FIG. 5 is a block diagram of one embodiment of an image display and measurement computer system of the present invention for displaying and taking measurements of and between objects depicted in the images captured by the image-capturing system of FIG. 1.

Referring now to FIG. 5, image display and measurement computer system 130, such as, for example, a conventional desktop personal computer or a mobile computer terminal in a police car, includes memory 132, input devices 134a and 134b, display device 136, and network connection 138. Image-capturing computer system 130 executes image display and analysis software 140, which is stored in memory 132. Memory 132 includes, for example, non-volatile read-only memory, random access memory, hard disk memory, removable memory cards and/or other suitable memory storage devices and/or media. Input devices 134a and 134b, such as, for example, a mouse, keyboard, joystick, or other such input devices, enable the input of data and interaction of a user with image display and analysis software 140 being executed by image display and measurement computer system 130. Display device 136, such as, for example, a liquid crystal display or cathode ray tube, displays information to the user of image display and measurement computer system 130. Network connection 138 connects image display and measurement computer system 130 to a network (not shown), such as, for example, a local-area network, wide-area network, the Internet and/or the World Wide Web.

Figure 6:
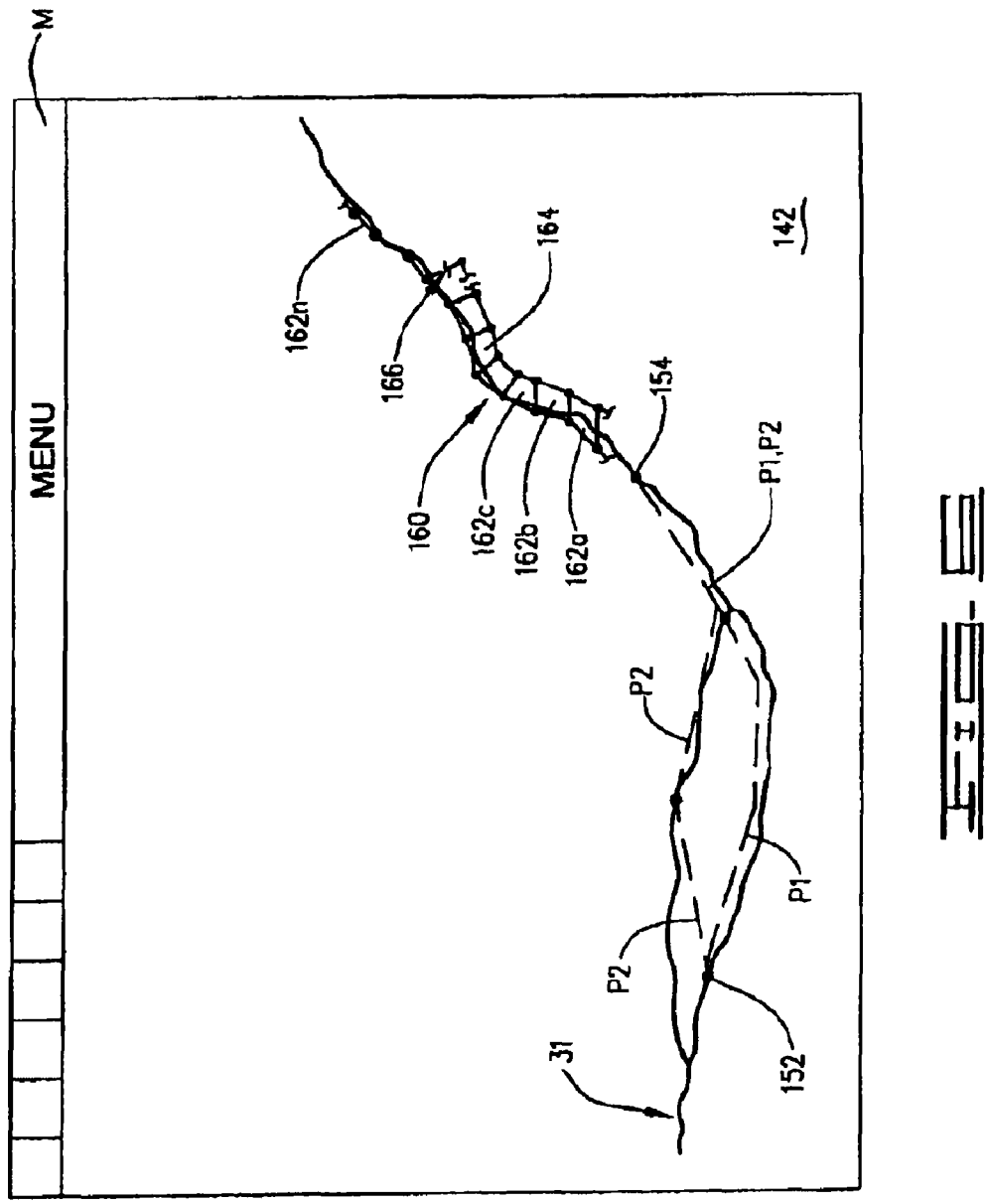
FIG. 6 depicts an exemplary image displayed on the system of FIG. 5, and illustrates one embodiment of the method of the present invention for the measurement of and between objects depicted in such an image.

In use, and referring now to FIG. 6, image display and measurement computer system 130 executing image display and analysis software 140 accesses one or more 10 output image and data files 120 that have been read into memory 132, such as, for example, via network connection 138, a floppy disk drive, removable memory card or other suitable means. One or more of the captured images $I_1, I_n, \ldots, I_n$ of output image and data files 120 is thereafter displayed as displayed oblique image 142 under the control of image display and analysis software 140. At approximately the same time, one or more data portions $C_{PD1}, C_{PD2}, \ldots, C_{PDn}$ corresponding to displayed oblique image 142 are read into a readily-accessible portion of memory 132.

It should be particularly noted that displayed oblique image 142 is displayed substantially as captured, i.e., displayed image 142 is not warped or fitted to any coordinate system nor is displayed image 142 ortho-rectified. Rather than warping displayed image 142 to a coordinate system in order to enable measurement of objects depicted therein, image display and analysis software 140, in general, determines the geo-locations of selected pixels only as needed, or "on the fly", by referencing data portions $C_{PD1}, C_{PD2}, \ldots, C_{PDn}$ of output image and data files 120 and calculating the position and/or geo-location of those selected pixels using one or more projection equations as is more particularly described hereinafter.

Generally, a user of display and measurement computer system 130 takes measurements of and between objects depicted in displayed oblique image 142 by selecting one of several available measuring modes provided within image display and analysis software 140. The user selects the desired measurement mode by accessing, for example, a series of pull-down menus or toolbars M, or via keyboard commands. The measuring modes provided by image display and analysis software 140 include, for example, a distance mode that enables measurement of the distance between two or more selected points, an area mode that enables measurement of the area encompassed by several selected and interconnected points, a height mode that enables measurement of the height between two or more selected points, and an elevation mode that enables the measurement of the change in elevation of one selected point relative to one or more other selected points.

After selecting the desired measurement mode, the user of image display and analysis software 140 selects with one of input devices 134a, 134b a starting point or starting pixel 152 and an ending point or pixel 154 on displayed image 142, and image display and analysis software 140 automatically calculates and displays the quantity sought, such as, for example, the distance between starting pixel 152 and ending pixel 154.

When the user selects starting point/pixel 152, the geo-location of the point corresponding thereto on surface 31 is calculated by image display and analysis software 140 which executes one or more projection equations using the data portions $C_{PD1}, C_{PD2}, \ldots, C_{PDn}$ of output image and data files 120 that correspond to the particular image being displayed. The longitude and latitude of the point on surface 31 corresponding to pixel 152 are then displayed by image display and analysis software 140 on display 136, such as, for example, by superimposing the longitude and latitude on displayed image 142 adjacent the selected point/pixel or in pop-up display box elsewhere on display 136. The same process is repeated by the user for the selection of the end pixel/point 154, and by image display and analysis software 140 for the retrieval and display of the longitude and latitude information.

The calculation of the distance between starting and ending points/pixels 152, 154, respectively, is accomplished by determining the geo-location of each selected pixel 152, 154 "on the fly". The data portions $C_{PD1}, C_{PD2}, \ldots, C_{PDn}$ of output image and data file 120 corresponding to the displayed image are retrieved, and the geo-location of the point on surface 31 corresponding to each selected pixel are then determined. The difference between the geo-locations corresponding to the selected pixels determines the distance between the pixels.

As an example of how the geo-location of a given point or pixel within displayed oblique image 142 is determined, we will assume that displayed image 142 corresponds to orthogonal image 104a (FIG. 1). The user of image display and analysis software 140 selects pixel 154 which, for simplicity, corresponds to center C (FIG. 1) of oblique image 104a. As shown in FIG. 1, line 106 extends along horizontal plane G from a point 108 thereon that is directly below image-capturing device 32*a* to the center C of the near border or edge 108 of oblique image 104*a*. An extension of primary axis $A_1$ intersects with center C. Angle Ø is the angle formed between line 106 the extension of primary axis $A_1$. Thus, a triangle (not referenced) is formed having vertices at image-capturing device 32*a*, point 108 and center C, and having sides 106, the extension of primary axis $A_1$ and vertical (dashed) line 110 between point 108 and image-capturing device 32*a*.

Ground plane G is a substantially horizontal, flat or non-sloping ground plane (and which typically will have an elevation that reflects the average elevation of the terrain), and therefore the above-described triangle includes a right angle between side/line 110 and sideline 106. Since angle Ø and the altitude of image-capturing device 32 (i.e., the length of side 110) are known, the hypotenuse (i.e., the length of the extension of primary axis $A_1$) and remaining other side of the right triangle are calculated by simple geometry. Further, since the exact position of image-capturing device 32*a* is known at the time the image corresponding to displayed image 142 was captured, the latitude and longitude of point 108 are also known. Knowing the length of side 106, calculated as described above, enables the exact geo-location of pixel 154 corresponding to center C of oblique image 104*a* to be determined by image display and analysis software 140. Once the geo-location of the point corresponding to pixel 154 is known, the geo-location of any other pixel in displayed oblique image 142 is determinable using the known camera characteristics, such as, for example, focal length, sensor size and aspect ratio, radial and other distortion terms, etc. The distance between the two or more points corresponding to two or more selected pixels within displayed image 142 is calculated by image display and analysis software 140 by determining the difference between the geo-locations of the selected pixels using known algorithms, such as, for example, the Gauss formula and/or the vanishing point formula, dependent upon the selected measuring mode. The measurement of objects depicted or appearing in displayed image 142 is conducted by a substantially similar procedure to the procedure described above for measuring distances between selected pixels. For example, the lengths, widths and heights of objects, such as, for example, buildings, rivers, roads, and virtually any other geographic or man-made structure, appearing within displayed image 142 are measured by selecting the appropriate/desired measurement mode and selecting starting and ending pixels.

It should be particularly noted that in the distance measuring mode of image display and analysis software 140 the distance between the starting and ending points/pixels 152, 154, respectively, is determinable along virtually any path, such as, for example, a "straight-line" path P1 or a path P2 that involves the selection of intermediate points/pixels and one or more "straight-line" segments interconnected therewith.

It should also be particularly noted that the distance measuring mode of image display and analysis software 140 determines the distance between selected pixels according to a "walk the earth" method. The "walk the earth method" creates a series of interconnected line segments, represented collectively by paths P1 and P2, that extend between the selected pixels/points and which lie upon or conform to the planar faces of a series of interconnected facets that define a tessellated ground plane. The tessellated ground plane, as will be more particularly described hereinafter, closely follows or recreates the terrain of surface 31, and therefore paths P1 and P2 also closely follow the terrain of surface 31. By measuring the distance along the terrain simulated by the tessellated ground plane, the "walk the earth" method provides for a more accurate and useful measurement of the distance between selected points than the conventional approach, which warps the image onto a flat earth or average elevation plane system and measures the distance between selected points along the flat earth or plane and substantially ignores variations in terrain between the points.

For example, a contractor preparing to bid on a contract for paving a roadway over uneven or hilly terrain can determine the approximate amount or area of roadway involved using image display and analysis software 140 and the "walk the earth" measurement method provided thereby. The contractor can obtain the approximate amount or area of roadway from his or her own office without having to send a surveying crew to the site to obtain the measurements necessary.

In contrast to the "walk the earth" method provided by the present invention, the "flat earth" or average elevation distance calculating approaches include inherent inaccuracies when measuring distances between points and/or objects disposed on uneven terrain and when measuring the sizes and/or heights of objects similarly disposed. Even a modest slope or grade in the surface being captured results in a difference in the elevation of the nadir point relative to virtually any other point of interest thereon. Thus, referring again to FIG. 1, the triangle formed by line 106, the extension of primary axis $A_1$ and the vertical (dashed) line 110 between point 108 and image-capturing device 32*a* may not be a right triangle. If such is the case, any geometric calculations assuming that triangle to be a right triangle would contain errors, and such calculations would be reduced to approximations due to even a relatively slight gradient or slope between the points of interest.

For example, if surface 31 slopes upward between nadir point N and center C at the near or bottom edge 108 of oblique image 104 then second line 110 intersects surface 31 before the point at which such intersection would occur on a level or non-sloping surface 31. If center C is fifteen feet higher than nadir point N and with a declination angle Ø equal to 40° (forty degrees), the calculated location of center C would be off by approximately 17.8 feet without correction for the change in elevation between the points.

As generally discussed above, in order to compensate at least in part for changes in elevation and the resultant inaccuracies in the measurement of and between objects within image 142, image display and analysis software 140 references, as necessary, points within displayed image 142 and on surface 31 to a pre-calculated tessellated or faceted ground plane generally designated 160 in FIG. 6. Tessellated ground plane 160 includes a plurality of individual facets 162*a*, 162*b*, 162*c*, etc., each of which are interconnected to each other and are defined by four vertices (not referenced, but shown as points) having respective elevations. Adjacent pairs of facets 162*a*, 162*b*, 162*c*, etc., share two vertices. Each facet 162*a*, 162*b*, 162*c*, etc., has a respective pitch and slope. Tessellated ground plane 160 is created based upon various data and resources, such as, for example, topographical maps, and/or digital raster graphics, survey data, and various other sources.

Generally, the geo-location of a point of interest on displayed image 142 is calculated by determining which of facets 162*a*, 162*b*, 162*c*, etc., correspond to that point of interest. Thus, the location of the point of interest is calculated based on the characteristics, i.e., elevation, pitch and slope, of facets 162*a*, 162*b*, 162*c*, etc., rather than based upon a flat or average-elevation ground plane. Error is introduced only in so far as the topography of surface 31 and the location of the point of interest thereon deviate from the planar surface of the facet 162*a*, 162*b*, 162*c*, etc, within which the point of interest lies. That error is reducible through a bilinear interpolation of the elevation of the point of interest within a particular one of facets 162a, 162b, 162c, etc., and using that interpolated elevation in the location calculation performed by image display and analysis software 140.

To use tessellated ground plane 160, image display and analysis software 140 employs a modified ray-tracing algorithm to find the intersection of the ray projected from the image-capturing device 32a or 32b towards surface 31 and tessellated ground plane 160. The algorithm determines not only which of facets 162a, 162b, 162c, etc., is intersected by the ray, but also where within the facet the intersection occurs. By use of bi-linear interpolation, a fairly precise ground location can be determined. For the reverse projection, tessellated ground plane 160 is used to find the ground elevation value for the input ground location also using bi-linear interpolation. The elevation and location are then used to project backwards through a model of the image-capturing device 32a or 32b to determine which of the pixels within displayed image 142 corresponds to the given location.

More particularly, and as an example, image display and analysis software 140 performs and/or calculates the geolocation of point 164 by superimposing and/or fitting tessellated ground plane 160 to at least a portion 166, such as, for example, a hill, of surface 31. It should be noted that only a small portion of tessellated ground plane 160 and facets 162a, 162b, 162c, etc., thereof is shown along the profile of portion 166 of surface 31. As discussed above, each of facets 162a, 162b, 162c, etc., are defined by four vertices, each of which have respective elevations, and each of the facets have respective pitches and slopes. The specific position of point 164 upon the plane/surface of the facet 162a, 162b, 162c, etc., within which point 164 (or its projection) lies is determined as described above.

Tessellated ground plane 160 is preferably created outside the operation of image display and measurement computer system 130 and image display and analysis software 140. Rather, tessellated ground plane 160 takes the form of a relatively simple data table or look-up table 168 stored within memory 132 of and/or accessible to image display and measurement computer system 130. The computing resources required to calculate the locations of all the vertices of the many facets of a typical ground plane do not necessarily have to reside within image display and measurement computer system 130. Thus, image display and measurement computer system 130 is compatible for use with and executable by a conventional personal computer without requiring additional computing resources.

Calculating tessellated ground plane 160 outside of image display and measurement computer system 130 enables virtually any level of detail to be incorporated into tessellated ground plane 160, i.e., the size and/or area covered by or corresponding to each of facets 162a, 162b, 162c, etc., can be as large or as small as desired, without significantly increasing the calculation time, slowing the operation of, nor significantly increasing the resources required by image display and measurement computer system 130 and/or image display and analysis software 140. Display and measurement computer system 130 can therefore be a relatively basic and uncomplicated computer system.

The size of facets 162a, 162b, 162c, etc., are uniform in size throughout a particular displayed image 142. For example, if displayed image 142 corresponds to an area that is approximately 750 feet wide in the foreground by approximately 900 feet deep, the image can be broken into facets that are approximately 50 square feet, thus yielding about 15 facets in width and 18 facets in depth. Alternatively, the size of facets 162a, 162b, 162c, etc., are uniform in terms of the number of pixels contained therein, i.e., each facet is the same number of pixels wide and the same number of pixels deep. Facets in the foreground of displayed image 142, where the pixel density is greatest, would therefore be dimensionally smaller than facets in the background of displayed image 142 where pixel density is lowest. Since it is desirable to take most measurements in the foreground of a displayed image where pixel density is greatest, creating facets that are uniform in terms of the number of pixels they contain has the advantage of providing more accurate measurements in the foreground of displayed image 142 relative to facets that are dimensionally uniform.

Another advantage of using pixels as a basis for defining the dimensions of facets 162a, 162b, 162c, etc., is that the location calculation (pixel location to ground location) is relatively simple. A user operates image display and measurement computer system 130 to select a pixel within a given facet, image display and analysis software 140 looks up the data for the facet corresponding to the selected pixel, the elevation of the selected pixel is calculated as discussed above, and that elevation is used within the location calculation.

Generally, the method of capturing oblique images of the present invention divides an area of interest, such as, for example, a county, into sectors of generally uniform size, such as, for example, sectors that are approximately one square mile in area. This is done to facilitate the creation of a flight plan to capture oblique images covering every inch of the area of interest, and to organize and name the sectors and/or images thereof for easy reference, storage and retrieval (a process known in the art as "sectorization"). Because the edges of any geographic area of interest, such as a county, rarely falls on even square mile boundaries, the method of capturing oblique images of the present invention provides more sectors than there are square miles in the area of interest—how many more depends largely on the length of the county borders as well as how straight or jagged they are. Typically, you can expect one extra sector for every two to three miles of border. So if a county or other area of interest is roughly 20 miles by 35 miles, or 700 square miles, the area will be divided into approximately from 740 to 780 sectors.

Figure 7:
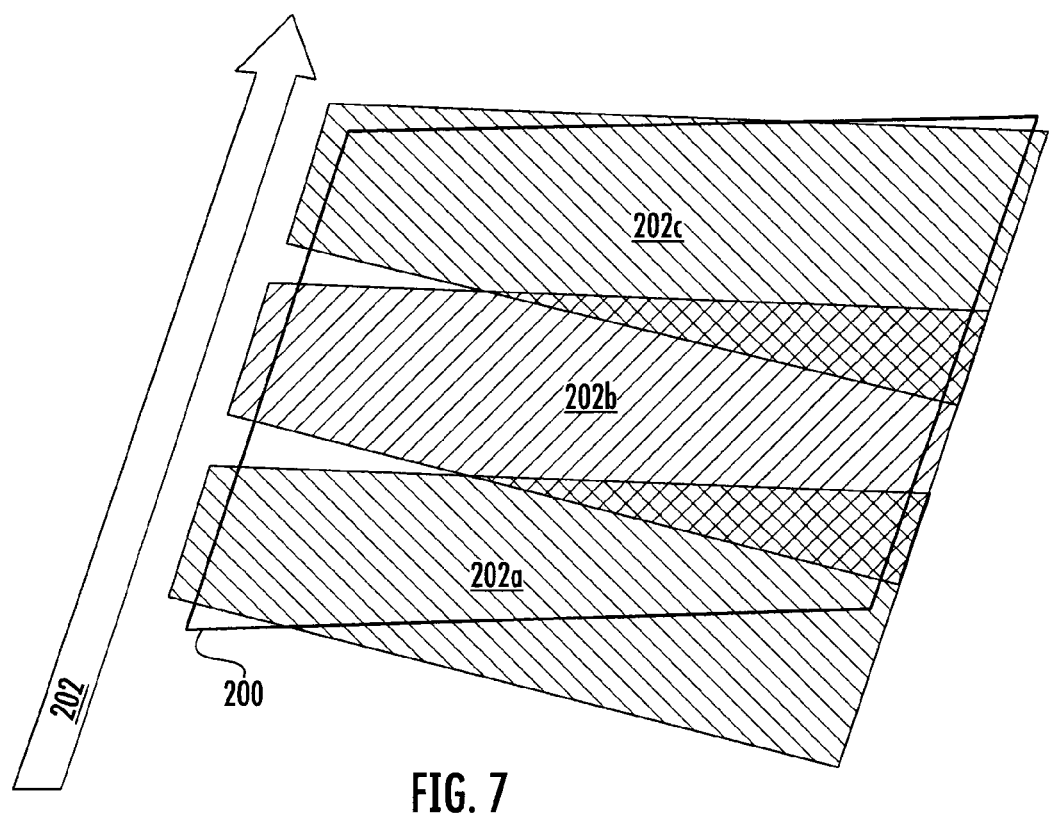
FIGS. 7 and 8 illustrate one embodiment of a method for capturing oblique images of the present invention.
Figure 8:
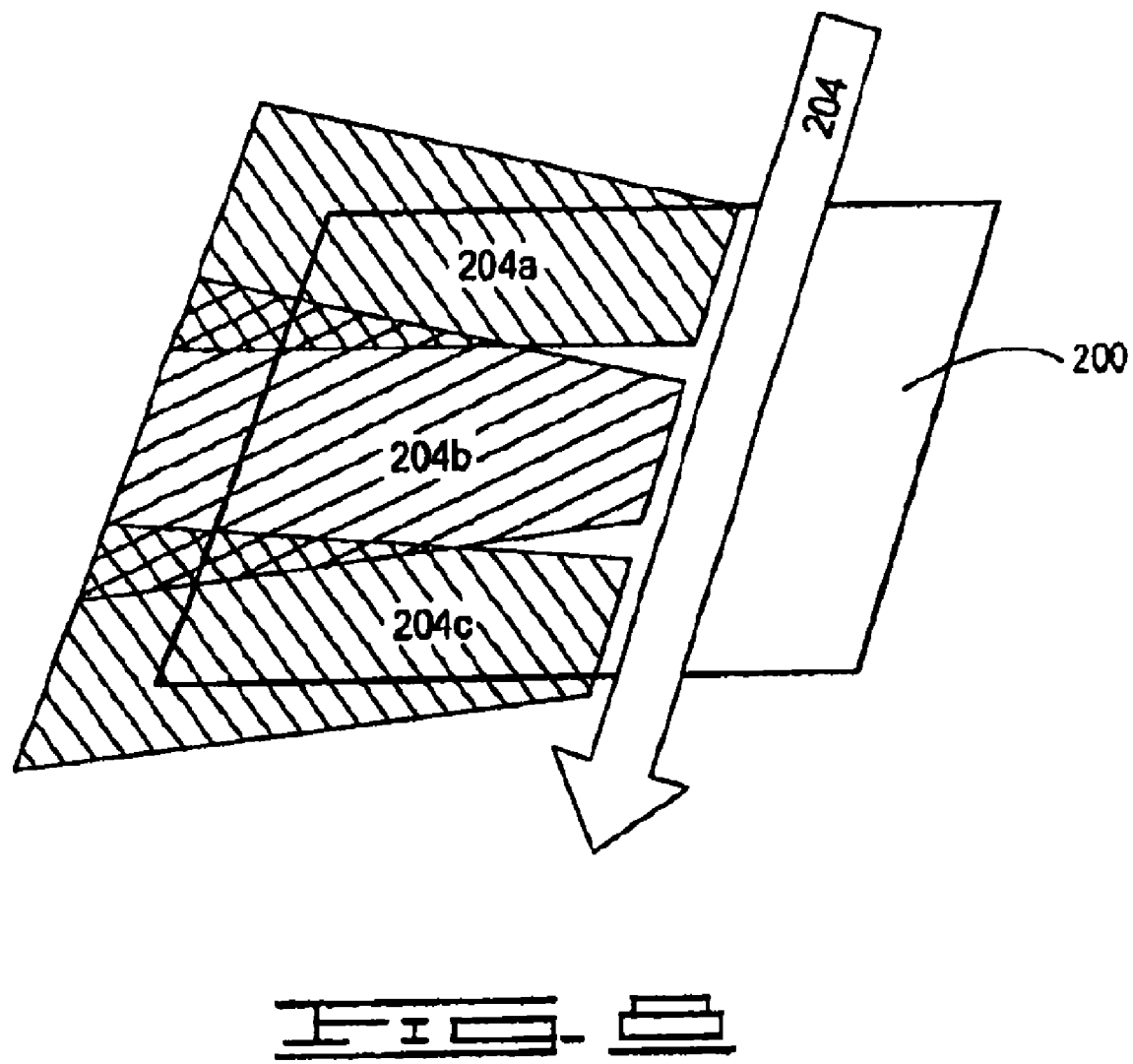

The method of capturing oblique images of the present invention, in general, captures the oblique images from at least two compass directions, and provides full coverage of the area of interest from at least those two compass directions. Referring now to FIGS. 7 and 8, a first embodiment of a method for capturing oblique images of the present invention is shown. For sake of clarity, FIGS. 7 and 8 is based on a system having only one image-capturing device. However, it is to be understood that two or more image-capturing devices can be used.

The image-capturing device captures one or more oblique images during each pass over area 200. The image-capturing device, as discussed above, is aimed at an angle over area 200 to capture oblique images thereof. Area 200 is traversed in a back-and-forth pattern, similar to the way a lawn is mowed, by the image-carrying device and/or the platform to ensure double coverage of area 200.

More particularly, area 200 is traversed by image-carrying device 32 and/or platform 20 following a first path 202 to thereby capture oblique images of portions 202a, 202b, and 202c of area 200. Area 200 is then traversed by image-carrying device 32 and/or platform 20 following a second path 204 that is parallel and spaced apart from, and in an opposite direction to, i.e., 180° (one-hundred and eighty degrees) from, first path 202, to thereby capture oblique images of portions 204a, 204b, 204c of area 200. By comparing FIGS. 7 and 8, it is seen that a portion 207 (FIG. 8) of area 200 is covered by images 202a-c captured from a first direction or perspective, and by images 204a-c captured from a second direction or perspective. As such, the middle portion of area 200 is 100% (one-hundred percent) double covered. The above-described pattern of traversing or passing over area 200 along opposing paths that are parallel to paths 202 and 204 is repeated until the entirety of area 200 is completely covered by at least one oblique image captured from paths that are parallel to, spaced apart from each other as dictated by the size of area 200, and in the same direction as paths 202 and 204 to thereby one-hundred percent double cover area 200 from those perspectives/directions.

Figure 9:
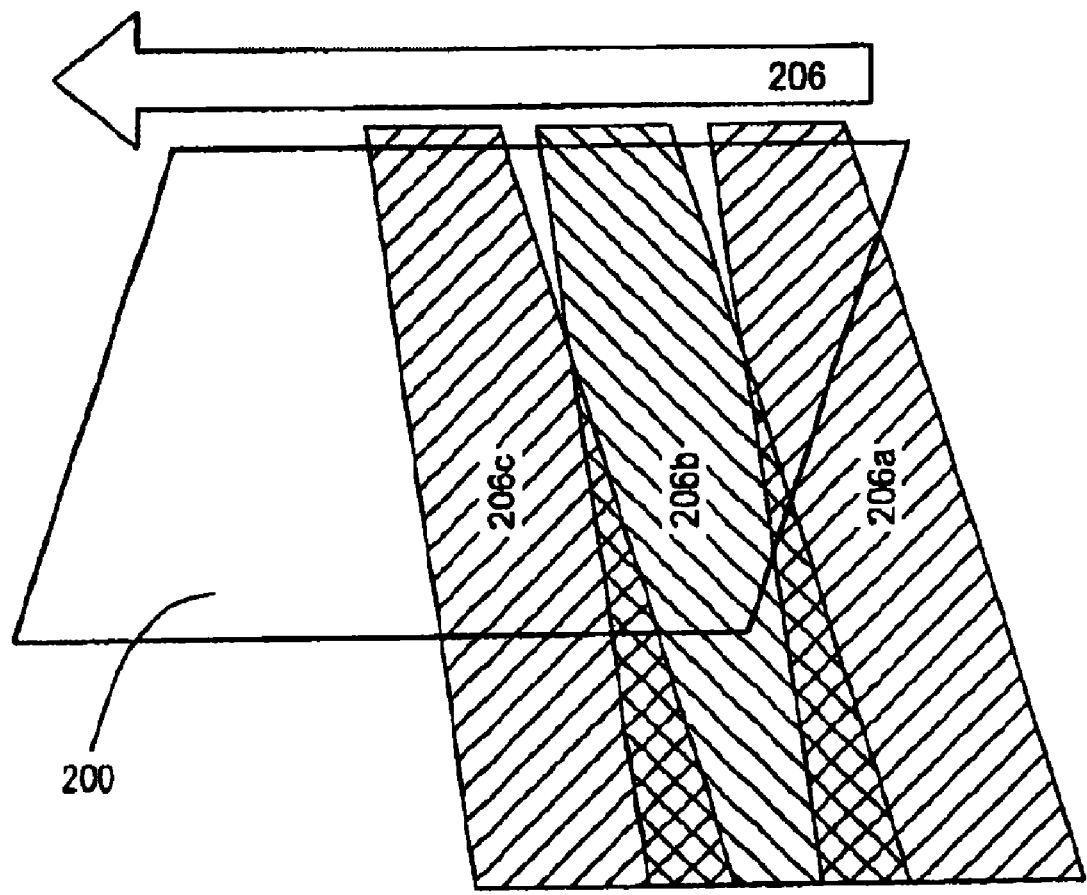
FIGS. 9 and 10 illustrate a second embodiment of a method for capturing oblique images of the resent invention.
Figure 10:
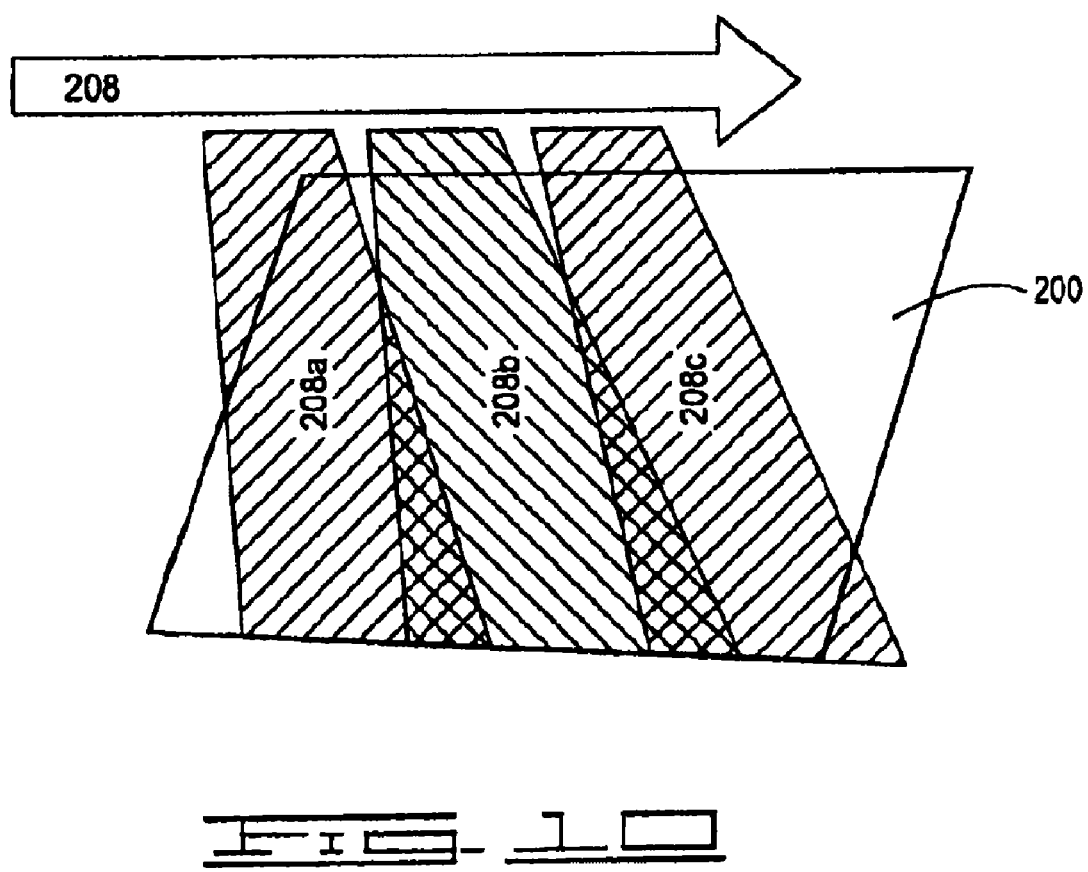

If desired, and for enhanced detail, area 200 is covered by two additional opposing and parallel third and fourth paths 206 and 208, respectively, that are perpendicular to paths 202 and 204 as shown in FIGS. 9 and 10. Area 200 is therefore traversed by image-carrying device 32 and/or platform 20 following third path 206 to capture oblique images of portions 206a, 206b and 206c of area 200, and is then traversed along fourth path 208 that is parallel, spaced apart from, and opposite to third path 206 to capture oblique images of portions 208a, 208b and 208c of area 200. This pattern of traversing or passing over area 200 along opposing paths that are parallel to paths 206 and 208 is similarly repeated until the entirety of area 200 is completely covered by at least one oblique image captured from paths that are parallel to, spaced apart from as dictated by the size of area 200, and in the same direction as paths 206 and 208 to thereby one-hundred percent double cover area 200 from those directions/perspectives.

As described above, image-carrying device 32 and/or platform 20, traverses or passes over area 200 along a predetermined path. However, it is to be understood that image-carrying device and/or platform 20 do not necessarily pass or traverse directly over area 200 but rather may pass or traverse an area adjacent, proximate to, or even somewhat removed from, area 200 in order to ensure that the portion of area 200 that is being imaged falls within the image-capture field of the image-capturing device. Path 202, as shown in FIG. 7, is such a path that does not pass directly over area 200 but yet captures oblique images thereof.

The present invention is capable of capturing images at various levels of resolution or ground sample distances. A first level of detail, hereinafter referred to as a community level, has a ground sample distance of, for example, approximately two-feet per pixel. For orthogonal community-level images, the ground sample distance remains substantially constant throughout the image. Orthogonal community-level images are captured with sufficient overlap to provide stereo pair coverage. For oblique community-level images, the ground sample distance varies from, for example, approximately one-foot per pixel in the foreground of the image to approximately two-feet per pixel in the mid-ground of the image, and to approximately four-feet per pixel in the background of the image. Oblique community-level images are captured with sufficient overlap such that each area of interest is typically covered by at least two oblique images from each compass direction captured. Approximately ten oblique community-level images are captured per sector.

A second level of detail, hereinafter referred to as a neighborhood level, is significantly more detailed than the community-level images. Neighborhood-level images have a ground sample distance of, for example, approximately six-inches per pixel. For orthogonal neighborhood-level images, the ground sample distance remains substantially constant. Oblique neighborhood-level images have a ground sample distance of, for example, from approximately four-inches per pixel in the foreground of the image to approximately six-inches per pixel in the mid-ground of the image, and to approximately ten-inches per pixel in the background of the image. Oblique neighborhood-level images are captured with sufficient overlap such that each area of interest is typically covered by at least two oblique images from each compass direction captured, and such that opposing compass directions provide 100% overlap with each other. Approximately one hundred (100) oblique area images are captured per sector.

It should be particularly noted that capturing oblique community and/or neighborhood-level images from all four compass directions ensures that every point in the image will appear in the foreground or lower portion of at least one of the captured oblique images, where ground sample distance is lowest and image detail is greatest.

In the embodiment shown, image-capturing and geo-locating system 30 includes a gyroscope, compass and altimeter. However, it is to be understood that the image-capturing and geo-locating system of the present invention can be alternately configured, such as, for example, to derive and/or calculate altitude, pitch, roll and yaw, and compass heading from the GPS and INU signals/data, thereby rendering one or more of the gyroscope, compass and altimeter unnecessary. In fact, in the embodiment shown, image-capturing devices are at an equal angle of declination relative to a horizontal plane. However, it is to be understood that the declination angles of the image-capturing devices do not have to be equal.

In the embodiment shown, image-capturing computer system executes image and data acquiring software' that issues a common or single image-capture signal to the image-capturing devices to thereby cause those devices to acquire or capture an image. However, it is to be understood that the present invention can be alternately configured to separately cause the image-capturing devices to capture images at different instants and/or at different intervals.

In the embodiment shown, the method of the present invention captures oblique images to provide double coverage of an area of interest from paths/perspectives that are substantially opposite to each other, i.e., 180° (one-hundred and eighty degrees) relative to each other. However, it is to be understood that the method of the present invention can be alternately configured to provide double coverage from paths/perspectives that are generally and/or substantially perpendicular relative to each other.

While the present invention has been described as having a preferred design, the invention can be further modified within the spirit and scope of this disclosure. This disclosure is therefore intended to encompass any equivalents to the structures and elements disclosed herein. Further, this disclosure is intended to encompass any variations, uses, or adaptations of the present invention that use the general principles disclosed herein. Moreover, this disclosure is intended to encompass any departures from the subject matter disclosed that come within the known or customary practice in the pertinent art and which fall within the limits of the appended claims.

What is claimed is:

1. A computerized system, comprising:
a computer system storing a database of captured oblique images, one of the oblique images being a first oblique image, and another one of the oblique images being a second oblique image, each of the first and second oblique images having corresponding geo-location data, and a data table storing ground plane data, the ground plane data comprising a plurality of facets, the facets having a plurality of elevation data that conforms to at least a portion of the terrain depicted within the captured oblique images, the computer system further having computer executable logic that when executed by a processor causes the computer system to receive a selection of a geographic point from a user, search the database to find oblique images that contain the selected point, and make the oblique images available to the user.

2. The computerized system of claim 1, wherein the first and second oblique images were captured by an image-capturing device, said geo-location data further comprises at least one of:

time data representing the time when an oblique image is captured;

location data representing the location of the image-capturing device when an oblique image is captured;

orientation data representing the orientation of the image-capturing device when an oblique image is captured;

correction data representing correction factors for the image-capturing device; and elevation data representing an average elevation of the surface captured by the image-capturing device.

3. The computerized system of claim 2, wherein said location data includes a latitude, a longitude, and an altitude of the image-capturing device when the oblique image is captured.

4. The system of claim 2, wherein said orientation data includes roll, pitch, yaw and heading of said image-capturing device when the oblique image is captured.

5. The computerized system of claim 2, wherein said image-capturing device is a camera and said correction data includes at least one of focal length, sensor size, aspect ratio, principle point offset, distortion, and pixel pitch.

6. The computerized system of claim 1, wherein the computer executable logic executed by the processor further causes the computer system to receive a starting geographic point and an ending geographic point from the user, search the database to find oblique images that contain the starting geographic point and the ending geographic point, and to make the oblique images available to the user.

7. The computerized system of claim 6, wherein the computer system further searches the database to find oblique images lying between the starting geographic point and the ending geographic point, and makes the oblique images available to the user.

8. The computerized system of claim 6, wherein the computer executable logic executed by the processor further causes the computer system to receive from the user one or more intermediate geographic points between the starting geographic point and the ending geographic point, to connect the one or more intermediate geographic points between the starting geographic point and the ending geographic point, search the database to find oblique images that contain the one or more intermediate geographic points, and make the oblique images available to the user.

9. The computerized system of claim 1, wherein the oblique images are made available to the user by displaying a thumbnail of the oblique image along with a bounding polygon corresponding to the oblique images and projected onto the ground.

10. The computerized system of claim 1, wherein, when the oblique images are made available to the user, a compass is displayed that shows the oblique images' compass orientation.

11. The computerized system of claim 1, wherein the oblique images that are made available to the user are displayed as an image.

12. The computerized system of claim 1, wherein the oblique images made available to the user are made available without distorting the natural appearance of the terrestrial features appearing in the oblique images.

13. The computerized system of claim 1, wherein the oblique images made available to the user are captured from at least two different compass directions.

14. The computerized system of claim 1, wherein the oblique images made available to the user are captured from four different compass directions.

15. A computerized system, comprising:

a computer system calculating a plurality of elevations of a tessellated ground plane for an oblique image having pixels using positional data corresponding to the oblique image, and data indicative of topography represented by the oblique image, the elevations of the tessellated ground plane conforming to the topography for the oblique image, and associating the tessellated ground plane with the oblique image.

16. A computerized system, comprising:

a computer system running image display and analysis software that when executed by the computer system causes the computer system to display an oblique image, reference positional data for the oblique image, and a pre-calculated ground plane for the oblique image, the pre-calculated ground plane comprising a plurality of facets, the facets having a plurality of elevation data, and conforming to the topography of an area captured within the oblique image, receive a selection of at least two pixels within the oblique image and calculate a desired measurement that takes into account changes within the topography of the area captured within the oblique image.

* * * * *